Oct. 4, 1927.
C. A. WARREN
WEEDER
Filed April 28, 1926     2 Sheets-Sheet 1
1,644,098
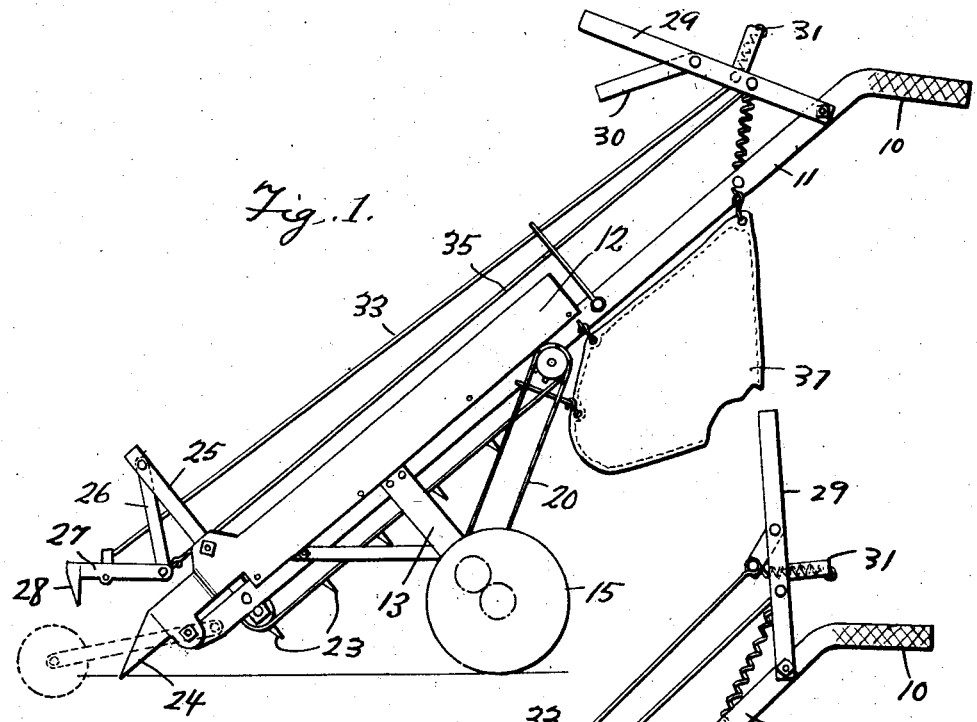
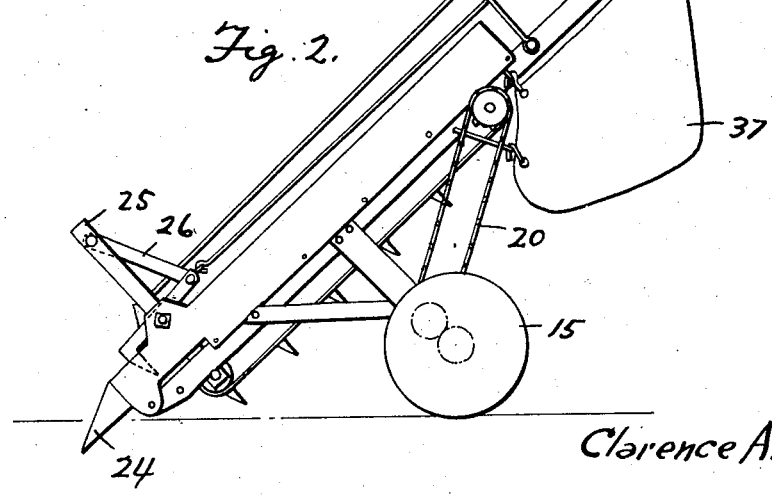
Clarence A. Warren
INVENTOR
BY *Victor J. Evans*
ATTORNEY
WITNESS: *Gerald Hennesy*

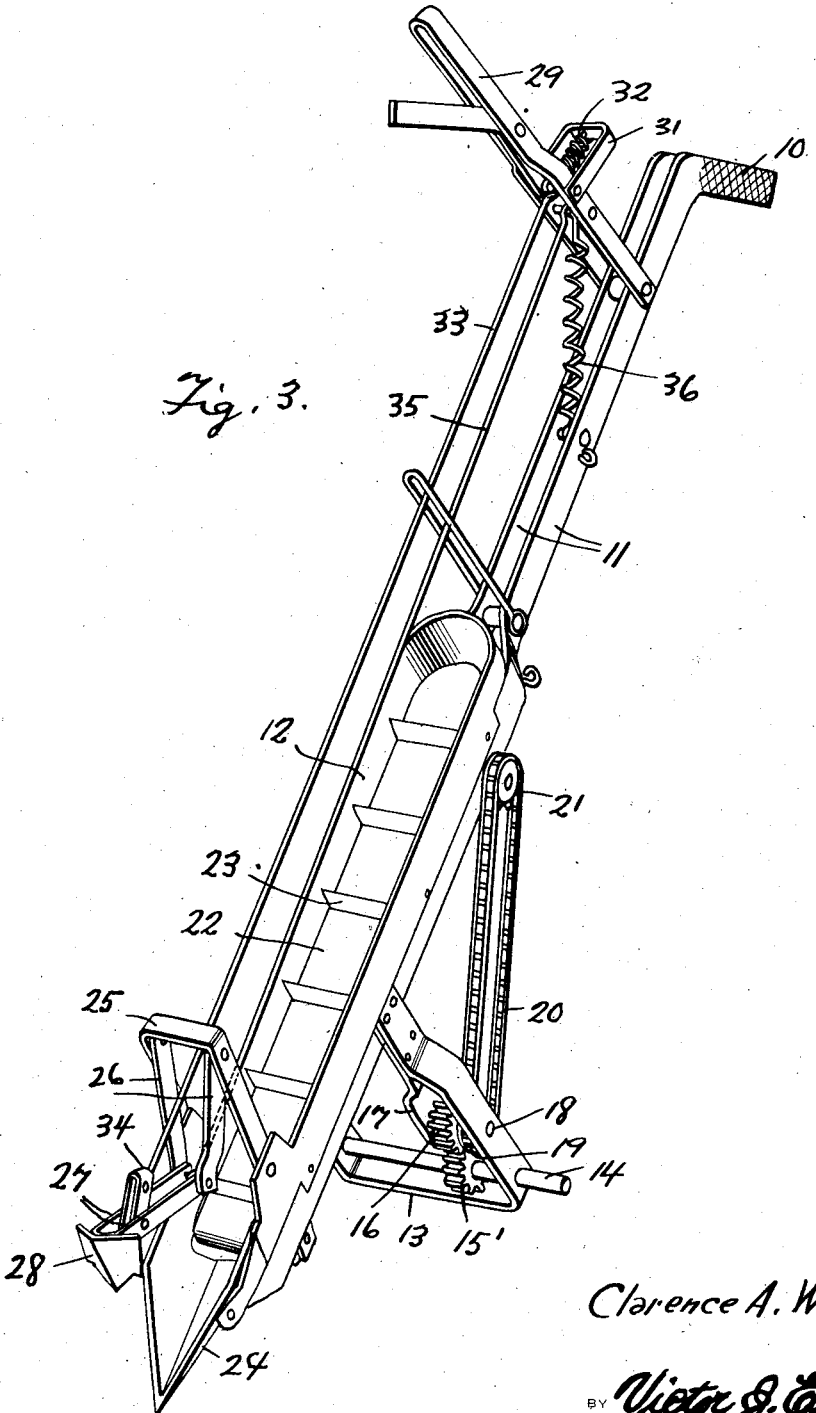

Patented Oct. 4, 1927.

1,644,098

UNITED STATES PATENT OFFICE.

CLARENCE A. WARREN, OF INDEPENDENCE, MISSOURI.

WEEDER.

Application filed April 28, 1926. Serial No. 105,235.

This invention relates to improvements in lawn implements in the nature of a weeder embodying among other characteristics a penetrating element adapted for digging dandelions and other weeds, which are subsequently deposited upon an endless conveyor.

Another object of the invention contemplates a cutter member operable in conjunction with the penetrating element to entirely remove the dandelions or other weeds, from the soil whereby the weeds may be subsequently moved along the penetrating element for deposition upon the endless conveyor.

With the above and other objects in view, the invention further consists in the following novel features and details of construction, to be hereinafter more fully described, illustrated in the accompanying drawings and pointed out in the appended claims.

In the drawings:

Figure 1 is a side elevation of the invention.

Figure 2 is a similar view of the same during the process of operation.

Figure 3 is a perspective of the invention per se.

Referring to the drawings in detail, wherein like characters of reference denote corresponding parts, the reference character 10 indicates an offset handle member carried upon the intermediate portion of plates 11; the latter being extended for connection upon one end of a conveyor frame 12.

A substantially U-shaped bracket 13 having the extremities thereof secured to the sides of the frame 12 is extended beneath the same and which has journaled within the side walls thereof an axle 14. Ground wheels 15 being fixed to the outer free ends of the axle. A gear 15' carried by the axle 14 is adapted for meshing engagement with a companion gear member 16 correspondingly mounted upon an axle 18 which is in turn journaled within one side of the bracket 13 and an angular plate member 17 disposed in spaced relation thereto. The gear 16 is furthermore provided with a gear member 19 over which is trained a chain 20 also extended over a gear member 21 carried by the conveyor frame 12 to facilitate the operation of an endless conveyor 22 operable therein.

Plate members 23 are transversely disposed at spaced intervals upon the conveyor.

A V-shaped penetrating element 24 is carried upon the forward end of the frame 12 and extended an appreciable distance therefrom, substantially as illustrated in Figure 3 of the drawings. A substantially inverted U-shaped bracket 25 is pivotally mounted for rocking movement upon the frame 12 adjacent the penetrating element 24. Pivoted links 26 carried by the bracket 25 are adapted for connection with plates 27 supporting a V-shaped cutter member 28.

An operating lever 29 bent upon itself has the extremities thereof journaled upon the plates 11 in the manner as illustrated in Figure 3 of the drawings. An auxiliary operating lever, constructed after the manner of the operating lever 29, is likewise connected with the operating lever 29.

A yoke 31 carried by the operating lever 29 is provided with a retractile spring 32 adapted for connection with extensions upon the extremities of the operating lever 30 to normally hold the latter in an inoperative position as illustrated in Figure 3 of the drawings. A rod 33 is adapted for connection with extensions upon the operating lever 30 and its opposite end connected with a link 34 supported upon the plate members 27. An operating rod 35 is adapted to establish communication between the junctures of association of the plate members 27 and pivoted links and the operating lever 29. A spring 36 being employed to normally hold the operating lever 29 in an inoperative position.

A collector or bag 37 is suspended from the underside of the plates 11 adjacent the discharge end of the endless conveyor 22 adapted to receive the discharge of the conveyor.

In the use and operation of the invention the handle 10 is grasped to push the device forwardly upon the wheels 15 in order that the penetrating element 24 may be inserted an appropriate depth within the sod or lawn, as illustrated in Figure 2 of the drawings. Such action will cause the penetrating element to be located directly beneath the roots of a weed. The auxiliary handle member is compressed to occupy a position within the operating lever 29, substantially as illustrated in Figure 2 of the drawings whereby the V-shaped cutter member 28 will be swung downwardly upon the upper side of the sod adjacent the weed. The operating lever 29 is then retracted to the position as illustrated in Figure 2 of the drawings to shift the cutter member 28 to the dotted line position whereby the weed, cut from the sod, will be entirely removed and deposited upon the endless conveyor. Further movement of the wheels 15 upon the device will operate the conveyor to deposit the weed within the collector or bag 37. The connection of the operating rod 35 at the point of intersection between the pivoted links 26 and plate members 27 will exercise a direct pull upon the cutter member 28 in the removal of the weed from the sod.

The invention is susceptible of various changes in its form, proportions and minor details of construction and the right is herein reserved to make such changes as properly fall within the scope of the appended claims.

Having thus described my invention what is claimed is:

1. A weeder comprising a housing having a handle member connected therewith and ground wheels suspended from the underside thereof, an endless conveyor mounted within the housing and operable upon the rotation of the ground wheels, a penetrating element mounted upon the forward end of the housing for undermining a weed and the sod adhering and clinging thereto, a cutter suspended above the penetrating element, operating levers mounted upon the upper side of the handle member for imparting a downward thrust and rearward sliding movement to the cutter upon the penetrating element in order that the weed may be entirely removed and placed upon the endless conveyor, and a bag suspended from the undersides of the handle member and adjacent the discharge end of the endless conveyor for the reception of the weeds therein.

2. A weeder comprising a frame including a handle, a penetrating element carried upon one end of the frame adapted for digging weeds, a yoke carried upon the frame being provided with pivoted links, a V-shaped cutter member provided with plate members pivotally connected with said links, an operating lever mounted upon the handle, an auxiliary lever carried by the operating lever, and rods connecting the plates and links and the cutter member with the levers to impart a downward thrust and rearward sliding movement to the cutter upon the penetrating element when the levers are called into use.

In testimony whereof I affix my signature.

CLARENCE A. WARREN.